United States Patent Office 2,714,795
Patented Aug. 9, 1955

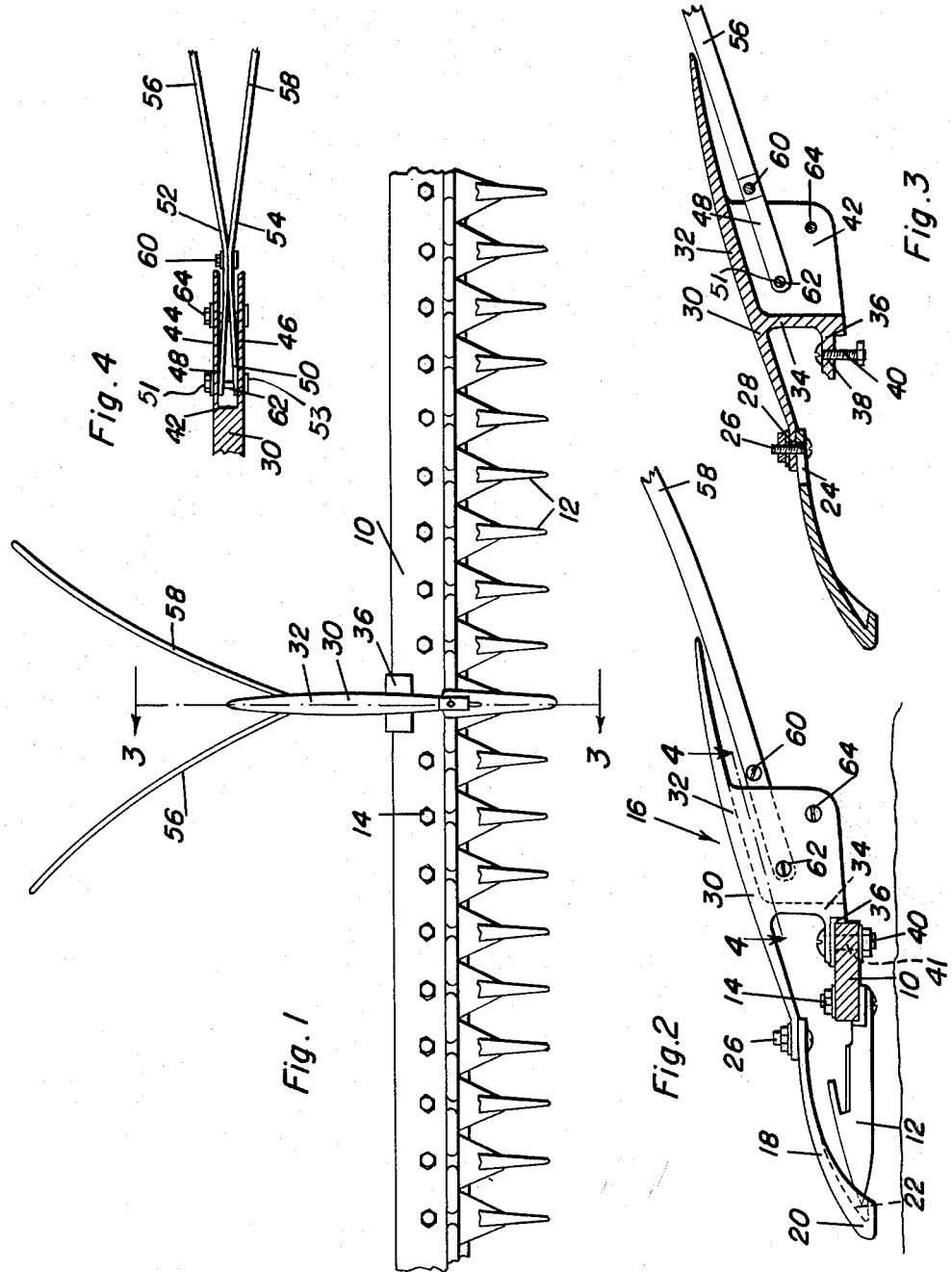

2,714,795

SWATHER FOR RECIPROCATING CUTTER

Thomas A. Clendening, Nampa, Idaho

Application May 7, 1953, Serial No. 353,617

3 Claims. (Cl. 56—314)

This invention relates to agricultural equipment and more particularly to a swather attachment adapted to be secured to the cutter bar of a combine or like item of farm machinery.

The primary object of this invention is to provide a swather which may be attached to the cutter bar of a combine in such a manner that comparatively large cutter bars can be used, the swather when placed in the center of the cutter bar divides the foliage, thus allowing the sun to penetrate, and forms two windrows behind the mower which can then be picked up by hay balers or the like without raking.

The construction of this invention also provides means for eliminating the crushing of the hay by the tricycle tractor used to provide motor power for the combine or mower.

The construction of this invention also features the use of a clip which is adjustably attached to a cutter bar engaging member having means for adjustably attaching dividing arms thereto. These dividing arms may be adjusted so that the diverging ends thereof are at heights desired by the operator.

Still further objects and features of this invention reside in the provision of a swather attachment for cutter bars of farm machinery that is strong and durable, simple in construction and operation, capable of being readily installed with a minimum of effort, and which are comparatively inexpensive to manufacture thus permitting wide distribution.

These, together with the various ancillary objects ad features of the invention which will become apparent as the following description proceeds, are attained by this swather, a preferred embodiment of which has been illustrated in the accompanying drawings, by way of example only, wherein:

Figure 1 is a plan view of a portion of a cutter bar with the swather attachment secured thereto;

Figure 2 is a side elevational view of the swather attachment shown as installed on the cutter bar with the cutter bar being shown in section;

Figure 3 is a sectional view as taken along the plane of line 3—3 in Figure 1; and Figure 4 is a sectional view as taken along the plane of line 4—4 of Figure 2 illustrating the manner in which the dividing arms are secured within the recess formed in the cutter bar engaging member.

With continuing reference to the accompanying drawings wherein like reference numerals designate similar parts throughout the various views, reference numeral 10 generally designates the cutter bar of a combine or mowing machine having a plurality of forwardly extending teeth 12 secured by means of bolt type fasteners 14 to the cutter bar 10.

The swather comprising the present invention is generally indicated by reference numeral 16 and includes a clip 18 having a nose piece 20 provided with a recess 22 therein for fitting over the pointed end of a tooth 12. The clip 18 is provided with a slot 24 in the rear portion thereof through which a bolt fastener 26 extends, the bolt 26 also extending through an aperture 28 in a cutter bar engaging member 30. Since the slot 24 is somewhat elongated the clip 18 may be readily adjusted to properly encompass the selected tooth of cutter bars of various thicknesses. The cutter bar engaging member 30 is provided with an arcuate rearwardly and upwardly extending portion 32 from which a web 34 depends. Secured to the web 34 is a substantially inverted L-shaped flange 36 which is adapted to overlie and partially embrace a portion of the upper rear edge of the cutter bar 10. An aperture 38 is formed in the flange 36 for reception of a bolt 40 which extends through an aligned aperture 41 in the cutter bar 10 so as to hold the cutter bar engaging member 30 in locked position on the cutter bar 10.

The cutter bar engaging member 30 is provided with a recess opening into the bottom and rear thereof as indicated at 42 formed by two substantially parallel rearwardly extending plates 44 and 46. Within the recess is received the forward diverging ends 48 and 50 of a pair of dividing arms 52 and 54 having divergent rear ends 56 and 58. The pair of dividing arms 52 and 54 are bolted together as at 60 between the ends 48 and 50, and 56 and 58. Apertures 51 and 53 are formed in the ends 48 and 50 of the dividing arms 52 and 54 and a bolt 62 extends through these apertures and through aligned apertures in the plates 44 and 46. Another bolt 64 is provided for use as a stop means for limiting the lowermost position to which the arms 52 and 54 can be rotated. It is to be specifically noted that the arms 48 and 50 will resiliently frictionally engage the inner surfaces of the plates 44 and 46 to frictionally hold the arms 52 and 54 in a preset and determined position as may be desired so as to provide means for adjusting the height of the ends 56 and 58 of the dividing arms 52 and 54 in accordance with the type of crop being mowed.

Since from the foregoing the construction and advantages of this swather are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A swather for use in combination with a cutter bar having a plurality of forwardly extending teeth comprising a clip adapted to be seated on one of said teeth and a bar engaging member adjustably attached to said clip and secured to said cutter bar, said clip having an elongated slot therethrough, and a fastener extending through said bar engaging member extending through said slot, said bar engaging member having a recess opening to the rear thereof, a pair of foliage dividing arms attached to each other medial the forward and rearward diverging ends of said dividing arms, and means pivotally mounting said dividing arms in said recess, said forward ends of said dividing arms resiliently frictionally engaging said bar engaging member within said recess, said recess being defined by a pair of spaced vertical plates integrally formed as part of said bar engaging member.

2. A swather for use in combination with a cutter bar having a plurality of forwardly extending teeth comprising a clip adapted to be seated on one of said teeth and a bar engaging member adjustably attached to said clip and secured to said cutter bar, said clip having an elongated slot therethrough, and a fastener extending through said bar engaging member extending through said slot, said bar engaging member having a forwardly extending flange adapted to overlie said cutter bar, said bar engaging member having a recess opening to the rear thereof, a pair of foliage dividing arms attached to each other medial the forward and rearward diverging ends of said dividing arms, and means pivotally mounting said dividing arms in said recess, said forward ends of said dividing arms resiliently frictionally engaging said bar engaging member within said recess.

3. A swather for use in combination with a cutter bar having a plurality of forwardly extending teeth comprising a clip adapted to be seated on one of said teeth and a bar engaging member adjustably attached to said clip and secured to said cutter bar, said clip having an elongated slot therethrough, and a fastener extending through said bar engaging member extending through said slot, said bar engaging member having a forwardly extending flange adapted to overlie said cutter bar, said bar engaging member having a recess opening to the rear thereof, a pair of foliage dividing arms attached to each other medial the forward and rearward diverging ends of said dividing arms, and means pivotally mounting said dividing arms in said recess, said forward ends of said dividing arms resiliently frictionally engaging said bar engaging member within said recess, said recess being defined by a pair of spaced vertical plates integrally formed as part of said bar engaging member.

References Cited in the file of this patent
UNITED STATES PATENTS

| | | |
|---|---|---|
| 606,137 | Hamilton | June 21, 1898 |
| 738,505 | Weynard | Sept. 8, 1903 |
| 1,598,843 | Bauercamper | Sept. 7, 1926 |
| 1,894,542 | Rivington | Jan. 17, 1933 |
| 2,618,114 | Gaterman, Sr. | Nov. 18, 1952 |